(12) United States Patent
Caretti et al.

(10) Patent No.: US 10,735,152 B2
(45) Date of Patent: Aug. 4, 2020

(54) CELLULAR MOBILE COMMUNICATION NETWORK HAVING NETWORK CELLS INTERCOMMUNICATING VIA RADIO SIGNALS, PARTICULARLY FOR NETWORK CELLS COORDINATION FOR INTERFERENCE CONTROL

(71) Applicant: TELECOM ITALIA S.p.A., Milan (IT)

(72) Inventors: Marco Caretti, Turin (IT); Gian Michele Dell'Aera, Turin (IT); Maurizio Fodrini, Turin (IT); Bruno Melis, Turin (IT); Dario Sabella, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 15/781,767

(22) PCT Filed: Dec. 28, 2015

(86) PCT No.: PCT/EP2015/081287
§ 371 (c)(1),
(2) Date: Jun. 6, 2018

(87) PCT Pub. No.: WO2017/114548
PCT Pub. Date: Jul. 6, 2017

(65) Prior Publication Data
US 2018/0367267 A1 Dec. 20, 2018

(51) Int. Cl.
*H04L 5/00* (2006.01)
*H04L 5/14* (2006.01)
(Continued)

(52) U.S. Cl.
CPC ......... *H04L 5/0032* (2013.01); *H04B 7/2615* (2013.01); *H04L 5/0023* (2013.01);
(Continued)

(58) Field of Classification Search
CPC ... H04B 7/2615; H04L 5/0032; H04L 5/0023; H04L 5/1438; H04W 40/06; H04W 72/0426; H04W 72/082
See application file for complete search history.

(56) References Cited

U.S. PATENT DOCUMENTS

2013/0003663 A1* 1/2013 Blankenship ......... H04L 1/0004
370/329
2013/0114528 A1* 5/2013 Chen .................... H04B 7/2656
370/329
(Continued)

FOREIGN PATENT DOCUMENTS

WO WO 2013/153128 A2 10/2013

OTHER PUBLICATIONS

International Search Report and Written Opinion dated Aug. 30, 2016 in PCT/EP2015/081287 filed Dec. 28, 2015.

*Primary Examiner* — Chi H Pham
*Assistant Examiner* — Weibin Huang
(74) *Attorney, Agent, or Firm* — Oblon, McClelland, Maier & Neustadt, L.L.P.

(57) ABSTRACT

A method for managing a cellular network. The cellular network includes a plurality of base stations each one configured to exchange data with user equipment located in a corresponding cell by exploiting a downlink data channel and an uplink data channel according to a frequency division duplexing scheme. The method includes: having a first base station exchanging coordination information with a second base station, the coordination information being related to at least one among channel state condition and resources
(Continued)

allocation to user equipment, the having the first base station exchanging coordination information with the second base station including: transmitting the coordination information from the first base station to the second base station exploiting a portion of the downlink data channel.

14 Claims, 3 Drawing Sheets

(51) Int. Cl.
    *H04W 72/08*     (2009.01)
    *H04W 40/06*     (2009.01)
    *H04B 7/26*     (2006.01)
    *H04W 72/04*     (2009.01)

(52) U.S. Cl.
    CPC ........... *H04L 5/1438* (2013.01); *H04W 40/06* (2013.01); *H04W 72/0426* (2013.01); *H04W 72/082* (2013.01)

(56) References Cited

U.S. PATENT DOCUMENTS

| | | | | |
|---|---|---|---|---|
| 2014/0071952 A1* | 3/2014 | Kim | ....................... | H04L 5/001 370/335 |
| 2014/0192759 A1* | 7/2014 | Son | ................... | H04W 72/0426 370/329 |
| 2014/0355494 A1* | 12/2014 | Jokela | ............... | H04W 72/0446 370/280 |
| 2015/0270879 A1* | 9/2015 | Chen | ..................... | H04L 5/0023 375/267 |
| 2015/0282043 A1* | 10/2015 | Fang | .................. | H04W 72/085 370/329 |
| 2015/0296390 A1* | 10/2015 | Mino Diaz | ............. | H04L 5/003 455/450 |
| 2015/0358962 A1* | 12/2015 | Lee | ................... | H04W 72/0446 370/336 |

* cited by examiner

CELLULAR MOBILE COMMUNICATION NETWORK HAVING NETWORK CELLS INTERCOMMUNICATING VIA RADIO SIGNALS, PARTICULARLY FOR NETWORK CELLS COORDINATION FOR INTERFERENCE CONTROL

BACKGROUND OF THE INVENTION

Field of the Invention

The present invention relates to telecommunications. Embodiments of the present invention relate to methods and systems for wireless communication networks, such as cellular networks. More in detail, the present invention relates to a method and a system for exchanging information among different cells of a cellular network by using wireless communication.

Overview of the Related Art

In a generic environment, such as in an urban environment, within a generic geographic area a plurality of network apparata capable of managing wireless communication (serving) terminal devices, or user equipment (e.g., cellular telephones, smartphones, tablets, etc.) are usually deployed to form a cellular network.

Such plurality of network apparata comprise network apparata of various typology (e.g., radio transceiver base stations, wireless access gateways, etc.) and arranged for exploiting various wireless communication technologies (e.g., Wi-Fi, Universal Mobile Telecommunications System—UMTS, Long-Term Evolution/Long-Term Evolution Advanced—LTE/LTE-A, as well as any of the new radio interfaces currently under discussion for future five generation (5G) wireless communication systems, etc.), therefore such a scenario is often indicated as a 'Heterogeneous Networks' (HetNet) scenario.

For example, in the currently available cellular networks, such as the ones complying with the 3GPP LTE/LTE-Advanced standard, data is allowed to be high-speed conveyed between a fixed-location transceiver base station (e.g., eNodeB) radiating radio waves over a respective coverage area (cell) and mobile user equipment (e.g., user terminals, such as cellular phones) within the cell.

In order to support the increasing traffic demand, it is known to deploy cellular networks in which the base stations are arranged in two levels. According to this architecture, the cellular network comprises high-power base stations—generally referred to as macro nodes-serving corresponding coverage area—generally referred to as macro cells. One or more low-power base stations—generally referred to as micro nodes—may be deployed within each macro cell to serve corresponding smaller extent coverage areas—generally referred to as small cells. This peculiar architecture helps to increase the QoS (Quality of Service) perceived by the user equipment, especially when located at cells' edges or near to traffic hot spots.

Generally, small cells may either operate with the same carrier frequency exploited by the macro cells or may exploit different frequencies. In the former case interference could be experienced between a small cell and a macro cell. However, even in the case in which small cells make use of frequencies different than those used for the macro cell, if the cellular network is arranged according to a dense deployment, interference among small cells (inter-cell interference) may still represent a severe limiting factor for the cellular network performances. In order to counteract the inter-cell interference, several mechanisms have been standardized in the LTE/LTE-A system, like for example ICIC (Inter-cell Interference Coordination), eICIC (enhanced ICIC) and CoMP (Coordinated Multipoint Transmission and Reception). However, in all these solutions the coordination among multiple cells requires that such cells are configured to promptly exchange coordination information related to the state of the radio channel—referred to as Channel State Information or CSI—and/or to the usage of the transmission resources. A known solution according to the 3GPP LTE standard provides that small cells may directly exchange such coordination information by exploiting the wired connection (e.g., optical fiber) of the X2 interface that directly connects the micro nodes of the cellular network. However, in case of a dense small cell deployment, the availability of such wired connection among micro nodes may not be possible for cost and/or complexity reasons. In this case, the coordination information among small cells have to be accomplished by exploiting the S1 interface, i.e., through the Evolved Packet Core (EPC) network. Having to exploit the EPC network, the corresponding latency may strongly degrade the cellular network performances. Another known solution according to the 3GPP LTE standard relies on a centralized arrangement where a same baseband controls multiple small cells, but an arrangement of this kind requires connections towards the sites with even higher bandwidths, increasing the complexity and the cost of the cellular network.

WO 2014/109683 discloses a method in which coordination information for controlling base-station-to-base-station interference is transmitted from one radio network node (e.g., an LTE eNodeB) to another, using certain parts of the TDD subframe. The method includes generating a TDD coordination signal and transmitting the TDD coordination signal to one or more other radio network nodes. The coordination signal may be transmitted in a guard period of a special subframe at the target node. Alternatively, the coordination signal may be transmitted in another interval during which the receiving node is not transmitting, such as in uplink subframe for the receiving node, in an uplink portion of a special subframe at the receiving node, or in a downlink subframe or downlink portion of a special subframe during which the receiving node is not transmitting.

WO 2013/153128 discloses a method and a system for communication in LTE networks. The method comprises having at least one user terminal communicating through a wireless connection to a macro cellular base station, and to at least one femto cellular base station, over a cellular system. The method further comprises providing a wireless X2 interface between said macro and femto cellular base stations to provide communication services to said at least one user terminal.

WO 2010/093644 discloses systems and methodologies that facilitate communicating between access points using the same air interface as for serving wireless devices. Access points can communicate with one another over the air interface to exchange interference management messages related to negotiating and/or allocating resources among the access points or other messages. In addition, access points can prepare served wireless devices for time periods where the access points communicate with disparate access points over the air interface to mitigate confusion or radio link failure detection by the served wireless devices.

SUMMARY OF INVENTION

The Applicant has found that the solutions known in the art are not efficient, since they are not capable to effectively exploit the resources of the transmission nodes for direct cell-to-cell communication, simultaneously providing mechanisms for limiting the interference towards the user terminals served in the cells. Moreover, several solutions proposed in the art lack scalability, thus limiting the amount of information that can be exchanged in a direct cell-to-cell communication.

The Applicant has tackled the problem of devising an effective solution aimed at reducing the interference in managing cell-to-cell coordination, especially when a wired connection among cells is not available or is not sufficient, in cellular networks designed to exchange data between cells and user equipment according to a frequency division duplexing scheme.

The Applicant has found that an efficient solution provides for enabling small cell-small cell communication by exploiting a portion of the downlink channel for exchanging communication information.

An aspect of the present invention relates to a method for managing a cellular network.

The cellular network comprises a plurality of base stations each one configured to exchange data with user equipment located in a corresponding cell by exploiting a downlink data channel and an uplink data channel according to a frequency division duplexing scheme.

The method comprises having a first base station exchanging coordination information with a second base station, said coordination information being related to at least one among channel state condition and resources allocation to user equipment.

Said having the first base station exchanging coordination information with the second base station comprises transmitting the coordination information from said first base station to said second base station exploiting a portion of the downlink data channel.

According to an embodiment of the present invention, said portion of the downlink channel is used also for the transmission of resource allocations to the user equipment.

According to an embodiment of the present invention, said transmitting the coordination information from said first base station to said second base station is carried out according to a time division duplexing scheme.

According to an embodiment of the present invention, said transmitting the coordination information from said first base station to said second base station comprises:
  retrieving from a routing table stored at the first base station a beamforming weight corresponding to said second base station;
  generating a message including said coordination information;
  transmitting said message on said portion of the downlink data channel by configuring at least one antenna of the first base station according to said retrieved beamforming weight.

According to an embodiment of the present invention, the method further comprises:
  retrieving from a routing table stored at the second base station a further beamforming weight corresponding to said first base station;
  carrying out detection on said portion of the downlink data channel by configuring at least one antenna of the second base station according to the retrieved further beamforming.

According to an embodiment of the present invention, said generating a message comprises generating:
  a payload message portion including said coordination information;
  an address message portion including an address identifier of the cell corresponding to the first base station and an address identifier of the cell corresponding to the second base station.

According to an embodiment of the present invention, said retrieving a beamforming weight corresponding to said first base station or to said second base station is carried out based on the address identifier of the cell corresponding to said first base station or to said second base station, respectively.

According to an embodiment of the present invention, said generating a message further comprises embedding the address message portion in an error detection message portion including a check word based on the payload portion.

According to an embodiment of the present invention, the method further comprises:
  calculating a new estimation of said further beamforming weight according to demodulation reference signals transmitted by the first base station on said portion of the downlink data channel;
  updating the routing table stored at the second base station by updating the further beamforming weight corresponding to said first base station according to said new estimation.

According to an embodiment of the present invention, said time division duplexing scheme is a token ring scheme or a carrier sense multiple access with collision detection scheme.

According to an embodiment of the present invention, said portion of the downlink data channel corresponds to:
  a frequency range comprising a set of resource blocks, and
  a time range comprising a set of transmission time intervals.

According to an embodiment of the present invention, said coordination information comprises information relating to at least one among:
  common reference signal configuration used by the base stations;
  reference signal received power measures of adjacent base stations;
  reference signal received quality measures of adjacent base station;
  list of neighboring base stations;
  list of allocated resource blocks in the current and/or next transmission time intervals in both downlink and uplink;
  level of measured uplink interference;
  transmission modes used in the allocated resource blocks in the current and/or next transmission time interval;
  transport format used in the allocated resource blocks in the current and/or next transmission time intervals;
  almost blank subframe transmission time interval pattern configured for the base stations;
  multicast broadcast single frequency network transmission time interval pattern configured for the base stations;
  power control bits, and
  data stored in media access control queues.

According to an embodiment of the present invention, said portion of the downlink data channel is an enhanced physical downlink control channel.

Another aspect of the present invention relates to a system. The system comprises a first base station and a second base station of a cellular network. Each one among said first and second base stations are configured to exchange data with user equipment located in a corresponding cell by exploiting a downlink data channel and an uplink data channel according to a frequency division duplexing scheme. Said first base station is further configured to exchange coordination information with said second base station. Said coordination information is related to at least one among channel state condition and resources allocation to user equipment. Said first base station is still further configured to transmit the coordination information to the second base station by exploiting a portion of the downlink data channel.

According to an embodiment of the present invention said cellular network is a cellular network complying with a selected one among 3G standard, 4G standard and 5G standard.

BRIEF DESCRIPTION OF THE ANNEXED DRAWINGS

These and other features and advantages of the present invention will be made evident by the following description of some exemplary and non-limitative embodiments thereof, to be read in conjunction with the attached drawings, wherein:

FIG. 1 schematically illustrates an exemplary cellular network in which the concepts according to an embodiment of the present invention can be applied;

DETAILED DESCRIPTION OF PREFERRED EMBODIMENTS OF THE INVENTION

Figure 1:
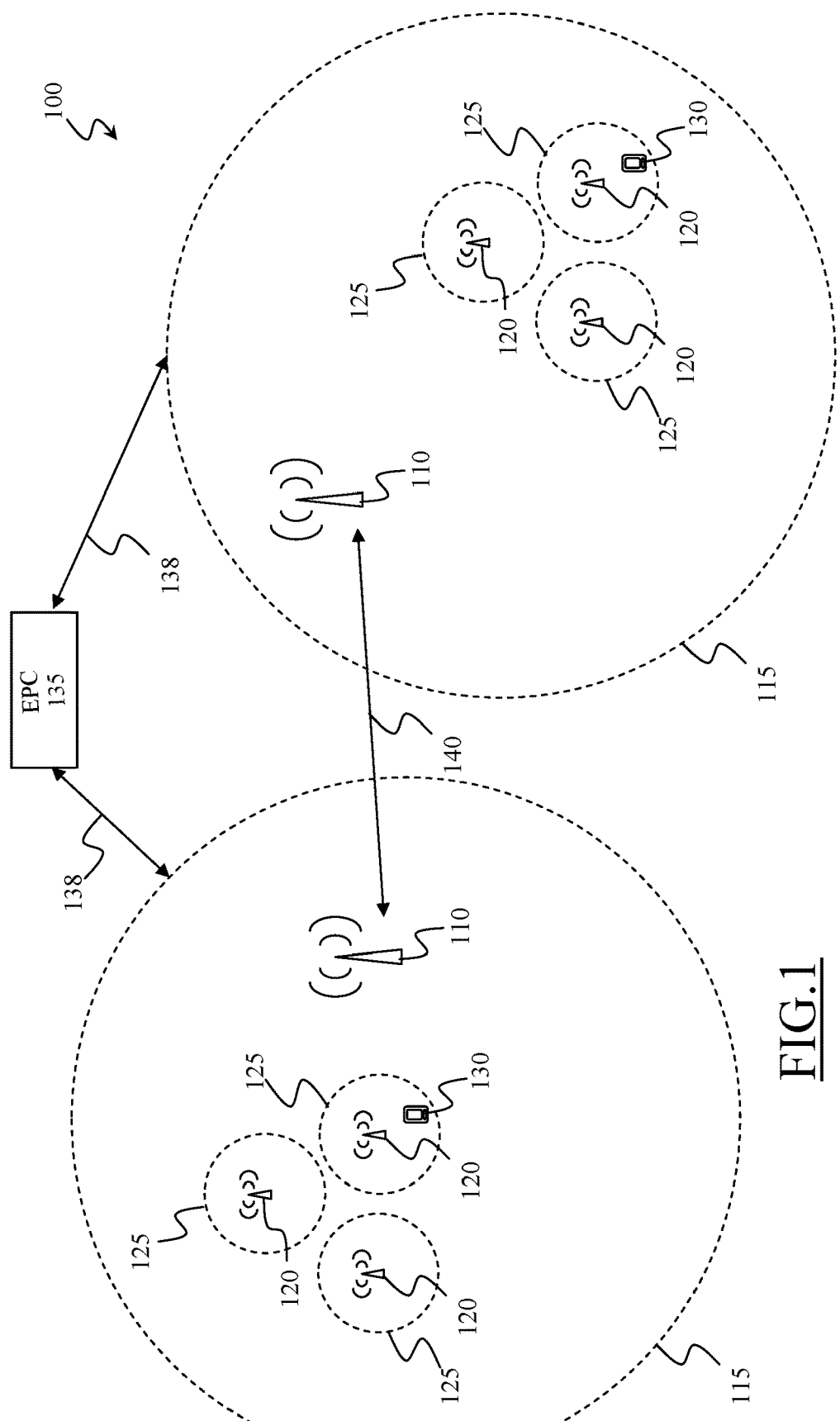

With reference to the drawings, FIG. 1 schematically illustrates an exemplary network arrangement, in which the concepts according to an embodiment of the present invention can be applied. FIG. 1 schematically illustrates a portion of a cellular network 100 (e.g., complying with the 3G or 4G standards, or also complying to future generation standards such as the 5G) which comprises a plurality of high power base stations, or macro nodes, 110 (only two of which being illustrated), each one configured to serve a corresponding coverage area, or macro cell, 115. Within at least some of the macro cells 115, a corresponding set of low-power base stations, or micro nodes, 120 are deployed, with each micro node 120 that is configured to serve a corresponding smaller extent coverage area, or small cell, 125.

The macro nodes 110 and the micro nodes 120 are configured to allow User Equipment (UE) 130 (e.g., smartphones) to exchange data (e.g., originating from web browsing, e-mailing, voice, or multimedia data traffic) when located inside the respective macro or small cells 115, 125. The cellular network 100 is configured so that data is exchanged between (macro or micro) nodes and UE using a Frequency Division Duplexing (FDD) technique, i.e., by exploiting different frequency bands for uplink and downlink, i.e., a dedicated uplink data channel and a dedicated downlink data channel.

The data transmission in cellular network 100 is based on Orthogonal Frequency Division Multiplexing (OFDM) technique, where radio resources are allocated in time/frequency domain. Considering for example the 4G standard, downlink and uplink transmissions are carried out based on transmission frames of 10 ms duration. In time domain, radio resources are distributed every Transmission Time Interval (TTI), each one lasting 1 ms (sub-frame) and comprising two time slots of 0.5 ms, whereas in frequency domain the whole bandwidth is divided into a plurality of 180-kHz sub-channels (each one corresponding to N=12 adjacent and equally spaced sub-carriers). A radio resource comprising a number of OFDM symbols (e.g., seven) spanning over one time slot in time domain and twelve adjacent sub-carriers in frequency domain is referred to as RB ("Resource Block"), and corresponds to the smallest radio resource that can be allocated to a UE 130 for data transmission. The concepts of the present invention apply also when the data transmission is carried out according to other known standards, such as the 3G, as well as according to new standards that are actually under study, such as the 5G. In this latter case, some new possibilities are being examined, like for example the Filter Bank Multi Carrier (FBMC), which is particularly suitable for the creation of notches in the transmission spectrum, thus facilitating the simultaneous transmission and reception in contiguous portions of the assigned band.

The Evolved Packed Core (EPC) of the cellular network 100 is schematized in FIG. 1 with block 135, which encompasses all the main subcomponents thereof, such as the Mobility Management Entity (MME), the PDN Gateway (PGW), the Serving Gateway (SGW), the Home Subscriber Server (HSS), the Evolved Packet Data Gateway (ePDG) and the Access Network Discovery and Selection Function (ANDSF). The macro cells 115 are coupled with the EPC 135 by means of the S1 interface, identified in FIG. 1 with reference 138.

As already mentioned in the introduction of the present document, in order to counteract inter-cell interference, there is the need to provide a mechanism that allows macro nodes 110 and micro nodes 120 to exchange coordination information related to the channel state condition (e.g., the CSI) and/or to information about resources allocation. For this purpose, macro nodes 110 are connected to each other by means of X2 interface wired connections 140 (e.g., optical fiber connections). In order to allow the micro nodes 120 as well to exchange coordination information, the X2 interface wired connections 140 might in principle be used for connecting to each other also the micro nodes 120 themselves. However, in case of dense small cell scenarios, i.e., when the number of micro nodes 120 is very high, use of X2 interface wired connections becomes impractical.

According to an embodiment of the present invention, a new method and system is provided for allowing the micro nodes 120 to efficiently exchange coordination information without involving the use of neither the X2 interface wired connections nor passing through the EPC 135. The novel method and system is based on the idea of establishing wireless communication among the small cells 125 by using (and exploiting an extension of) the enhanced Physical Downlink Control Channel (ePDCCH) already available in the current standards.

Figure 2:
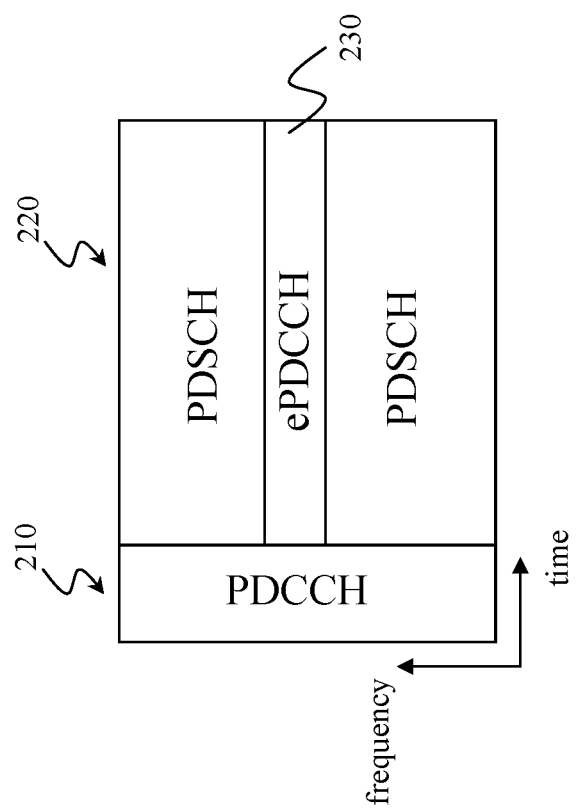
FIG. 2 shows how resources of a subframe can be allocated in the time/frequency domain in the cellular network of FIG. 1.

Making reference to FIG. 2, the allocable resources corresponding to a subframe (1 ms) may be subdivided in two portions:

Physical Downlink Control Channel (PDCCH) 210, relating to UE-specific scheduling assignments for Downlink (DL) resource allocation, Uplink (UL) grants, Physical Random Access Channel (PRACH) responses, UL power control commands, and common scheduling assignments for signaling messages (such as system information, paging, etc.);

Physical Downlink Shared Channel (PDSCH) 220, the downlink data channel for the actual data transmission toward UE 130. The ePDCCH (identified in FIG. 2 with reference 230) is located within the PDSCH 220 and occupies few selected RB pairs (e.g., 1, 2, 4 or 8).

According to the current standards, the original function of the ePDCCH 230 is to transmit to the UE 130 the downlink and uplink resource allocations decided by the schedulers located in the various macro nodes 110 every subframe. The ePDCCH 230 does not span the entire bandwidth, does not make use of resources within the PDCCH 210, and is configured to exploit dedicated reference symbols to allow user specific beamforming and improved link adaption.

Applicant has observed that the features of the ePDCCH 230 may be advantageously exploited to directly allow small cells 125 to communicate to each other in order to exchange coordination information. Indeed, the ePDCCH 230 is localized in frequency, and occupies only a limited number of RB; therefore, if the ePDCCH 230 is used for small cell-small cell communication, the interference generated on the PDSCH 220 by this peculiar usage can be controlled in an effective way by using a specific transmission protocol. Moreover, since the ePDCCH 230 is provided with specific Demodulation Reference Signal (DM-RS) that enable the application of beamforming techniques, it is possible to exploit also this feature as a further tool for reducing the interference generated in the cellular network 100 by the small cell-small cell communication.

In view of the above, according to an embodiment of the present invention, small cell-small cell communication is enabled by reserving, for a time range comprising a set of subframes, a frequency range comprising a set of RBs of the PDCCH 210 corresponding to the ePDCCH 230, with said set of RBs that is semi-statically configured for this purpose. This configuration may be directly carried out by the macro nodes 110, or also by the Operation & Maintenance (O&M) of the cellular network 100. In this way, each micro node 120 is in principle capable of transmitting and receiving coordination information using said set of configured RBs.

As will be described in detail in the following of the present document, in order to enable the small cell-small cell communication according to the embodiments of the present invention, proper extensions to ePDCCH message is introduced in order to enable node to node transmission and reception. For example, such extension may provide for the embedding of source and destination addresses, e.g., in the CRC.

Moreover, in order to avoid collisions during the small cell-small cell communication, a protocol based on Time Division Duplexing (TDD) is provided, such as Token Ring or Carrier Sense Multiple Access with Collision Detection (CSMA/CD).

According to an embodiment of the present invention, the possibility to enable both Broadcast/Multicast, such as Point-to-multiPoint communication (PtmP) and unicast transmissions, such as Point-to-Point communication (PtP) is provided.

Moreover, according to an embodiment of the present invention, suitable routing tables are provided for the management of Beamforming weights to enable of self-organization capabilities.

Hereinafter, it is assumed that the original features and functionalities of the ePDCCH 230 are reused and when necessary conveniently extended. This is particularly advantageous for 4G communication systems like LTE and LTE-A due to the inherent implementation advantages. However, if the concepts according to the embodiments of the invention are applied to future 5G systems, it is possible to assume that similar considerations may be applied to a different control channel, having same (or similar) features of the ePDCCH 230 discussed above. Moreover, the concepts according to the embodiments of the invention can be also applied to 3G communication systems, by exploiting the High Speed-Physical Downlink Shared Channel (HS-PDSCH) in the place of the PDSCH and the High Speed-Shared Control Channel (HS-SCCH) in the place of the ePDCCH.

The original function of the ePDCCH 230 provides for a unidirectional communication from micro nodes 120 to UE 130; in this case, the micro nodes 120 act as transmitter, and the UE 130 act as receiver. According to an embodiment of the present invention, the ePDCCH 230 is also exploited for establishing a bidirectional communication between two micro nodes 120; in this case, the micro nodes 120 may acts both as transmitters and receivers.

According to an embodiment of the present invention, and considering the application in 4G systems, when a micro node 120 acts as a transmitter, its operation follows what is defined in the 4G standard for the normal utilization of the ePDCCH 230. The only difference, with respect to the normal transmission using the ePDCCH 230, relates to the message content/size, and the methods used to identify the sender and the destination of the message.

According to an embodiment of the present invention, when a micro node 120 acts as a receiver, it behaves in the same way as a UE 130, which tries to decode incoming messages using the same blind decoding techniques used for the downlink communication from micro node 120 to UE 130.

At present it may be assumed that the simultaneous transmission and reception in the set of RBs corresponding to the ePDCCH 230 which are reserved for small cell-small cell communication is not possible for a given small cell 125. Therefore, according to an embodiment of the present invention a specific duplexing protocol—i.e., a TDD—is defined for the separation of transmission and reception. However, in the future, with the advance of the emerging full duplexing technology it may be also possible for a given micro node 120 to have simultaneous transmission and reception in the RBs dedicated to the small cell-small cell communication.

Figure 3:
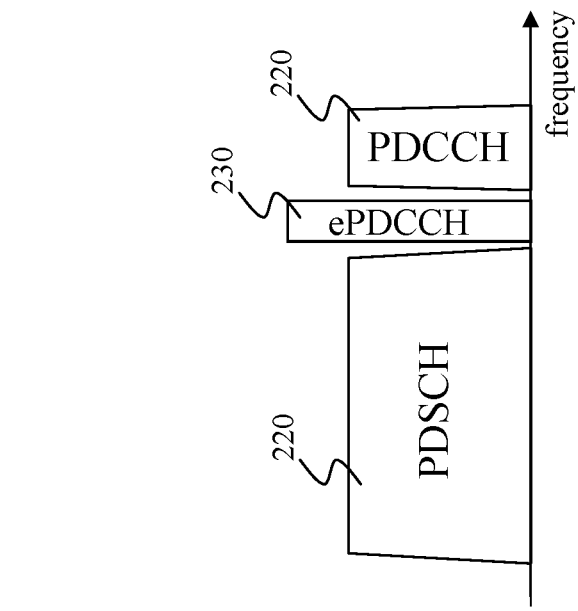
FIG. 3 shows an example of resource allocation in the frequency domain according to an embodiment of the present invention.

FIG. 3 shows an example of resource allocation in the frequency domain of the downlink band PDSCH 220 according to an embodiment of the present invention for both the unidirectional communication from micro node 120 to UE 130, and for the bidirectional communication from a micro node 120 to another micro node 120. As can be seen in FIG. 3, the portion of the downlink band PDSCH 220 corresponding to the ePDCCH 230 is used for the bidirectional communication between micro nodes 120, while the remaining portions are normally used for the unidirectional communication from micro node 120 to UE 130.

In case of 4G communication systems based on OFDMA it is possible to assume that the self-interference caused by the transmission in the portion of the PDSCH 220 allocated for small cell to UE communication is compatible with the simultaneous reception in the band ePDCCH 230 allocated for small cell to small cell communication. According to an embodiment of the present invention, several design techniques may be employed for reducing this interference, including: the usage of algorithms for the cancellation of the self-interference, the insertion of a suitable guard band around the band ePDCCH 230 allocated for small cell to small cell communication or specific power control methods that reduce the transmit power for the RBs belonging to the portion of the PDSCH 220 allocated for small cell to UE communication located near to the band ePDCCH 230 allocated for small cell to small cell communication. In addition, according to an embodiment of the present invention, in order to provide additional isolation, the small cell to small cell communication is carried out by using different antennas compared to that used for small cell to UE communication.

If the concepts of the present invention are applied in 5G communication systems based on new waveforms specifically designed to facilitate the spectrum coexistence (like for example FBMC), the coexistence of the transmission and reception in frequency bands that are very close to each other is simplified due to the very low level of the side lobes of these new waveforms compared to OFDM.

According to an embodiment of the present invention, the transmission and reception in the band ePDCCH 230 dedicated to small cell to small cell communication is carried out according to a token ring protocol, since the token ring protocol is a medium access control protocol that does not require any form of sensing and thus avoids collisions on the radio channel. Making reference to the exemplary case illustrated in FIG. 1, wherein a set of three small cells 125 are located within a macro cell 115, the small cell to small cell communication is carried out by having each micro node 120 among said three small cells 125 that is constrained to transmit in a specific subframe, during which the others two micro nodes 120 act as receivers. Through O&M or by the supervision of the macro node 110 serving the macro cell 115 wherein said set of small cells 125 are deployed, the RBs in the downlink band are reserved and configured at the three small cells 125 for the inter-small cell communication. Also the periodicity of the token ring protocol is configured, by defining which small cell transmits in which subframe, according to a predefined configurable pattern.

The token ring is just an example of protocol that can be used for duplexing and avoidance of collisions among the small cells 125. Other protocols, like for example CSMA/CD (Carrier Sense Multiple Access with Collision Detection), which exploit channel sensing and back-off procedures can be used for the same scope.

The above mentioned protocols are such to establish a Point to multi Point (PtmP) communication among a set of small cells 125. A drawback of PtmP resides that the broadcast transmission coming from a small cell 125 of the set may interfere with the transmission of data from macro nodes 110 or with other small cells 125 that do not belong to the set.

Since the ePDCCH 230 is already provided with dedicated pilot symbols, according to an embodiment of the present invention, a beamforming technique is advantageously used to configure the antenna(s) of the cellular network nodes to reduce such interference. According to an embodiment of the present invention, each micro node 120 is configured to store a routing table RT listing beamforming weights to be used for PtmP as well as for Point to Point communication with a corresponding set of other micro nodes 120.

An example of a possible routing table RT stored in a micro node 120 designed to communicate with a corresponding set S of n other micro nodes 120 according to an embodiment of the present invention is provided hereinbelow.

| Beamforming Weight | Cell ID | Transmission Power [dBm/Hz] |
|---|---|---|
| W(1) | A(1) | P(1) |
| ... | ... | ... |
| W(i) | A(i) | P(i) |
| ... | ... | ... |
| W(n) | A(n) | P(n) |
| W(BRD) | A(BRD) | P(BRD) | wherein:
  W(i) (i=1, 2, ..., n) is the beamforming weight to be used by the micro node 120 storing the routing table RT for configuring its antenna(s) in order to selectively communicate with the i-th micro node 120 of the set S;
  A(i) (i=1, 2, ..., n) is the Cell ID of the small cell 125 served by the i-th micro node 120 of the set S;
  P(i) (i=1, 2, ..., n) is a transmission power density indicator providing an indication about the transmission power density to be used by the micro node 120 storing the routing table RT for communicating with the i-th micro node 120 of the set S;
  W(BRD) is the beamforming weight to be used by the micro node 120 storing the routing table RT for configuring its antenna(s) in order to carry out a broadcast communication;
  A(BRD) is a dedicated Cell ID (not corresponding to any real cell) corresponding to a broadcast type communication;
  P(BRD) is the transmission power density indicator providing an indication about the transmission power density to be used by the micro node 120 storing the routing table RT for carry out a broadcast communication.

Since according to an embodiment of the present invention both the transmission and reception are carried out on a same frequency sub-band (by exploiting the ePDCCH 230), the routing table RT and particularly the beamforming weights listed therein may be used both for the transmission and for the reception.

According to an embodiment of the present invention, a first micro node 120 is configured to exchange coordination information with a second micro node 120 by retrieving the Cell ID A(i) of the small cell 125 served by such second micro node 120, retrieving the corresponding beamforming weight W(i) and the corresponding transmission power density indicator P(i) from the routing table RT, and then establishing a PtP communication with the second micro node 120 by applying the retrieved beamforming weight W(i) and by setting the transmission power based on the retrieved transmission power density indicator P(i).

According to an embodiment of the present invention, a micro node 120 is also configured to exchange coordination information with a plurality of micro nodes 120 by retrieving the Cell ID A(BRD) corresponding to a broadcast type communication, retrieving the corresponding beamforming weight W(BRD) and the corresponding transmission power density indicator P(BRD) from the routing table RT, and then establishing a PtmP communication with the micro nodes 120 by applying the retrieved beamforming weight W(i) and by setting the transmission power based on the retrieved transmission power density indicator P(i).

According to an embodiment of the present invention, a micro node 120 may communicate with a specific subset of small cells 125 (referred to as "group"). For this purpose, multiple group IDs (each one linked to a different beamforming set) may be defined for different subsets of small cells 125 to exchange coordination information with.

According to an embodiment of the present invention, the transmission power (corresponding to the various transmission power density indicators P(i)) to be used for exchanging coordination information among small cells 125 may be also iteratively optimized by means of a PtP distributed power control algorithm which minimizes the interference and maximizes the energy efficiency of the network. This algorithm is based on the exchange of power control bits among the nodes. These bits are carried by the PtP messages and based on the measure of the Signal to Interference plus Noise Ratio (SINR) or other metrics like the Block Error Rate (BLER) of the decoded messages received on the ePDCCH 230. In general, the SINR or the target BLER, conveniently averaged over a suitable number of PtP messages between a transmitting small cell 125 (hereinafter identified as 125(t)) and a receiving small cell 125 (hereinafter identified as 125(r)), are compared with a given threshold. Based on this comparison the receiving small cell 125(r) sends on the next PtP message to the transmitting small cell 125(t) a power control command for increasing, reducing or even maintaining constant the transmit power density (i.e., the corresponding transmission power density indicator P(i)). In case of broadcast or group transmission, the transmit power density can be set in different ways. For example, in order to guarantee that a group of n small cells 125 in the proximity of a transmitting small cell 125(t) can be reached, the maximum among the transmission power density indicator P(i) used for PtP communication can be selected, so that to set P(BRD)=max (P(1), P(2), . . . , P(n)).

Figure 4:
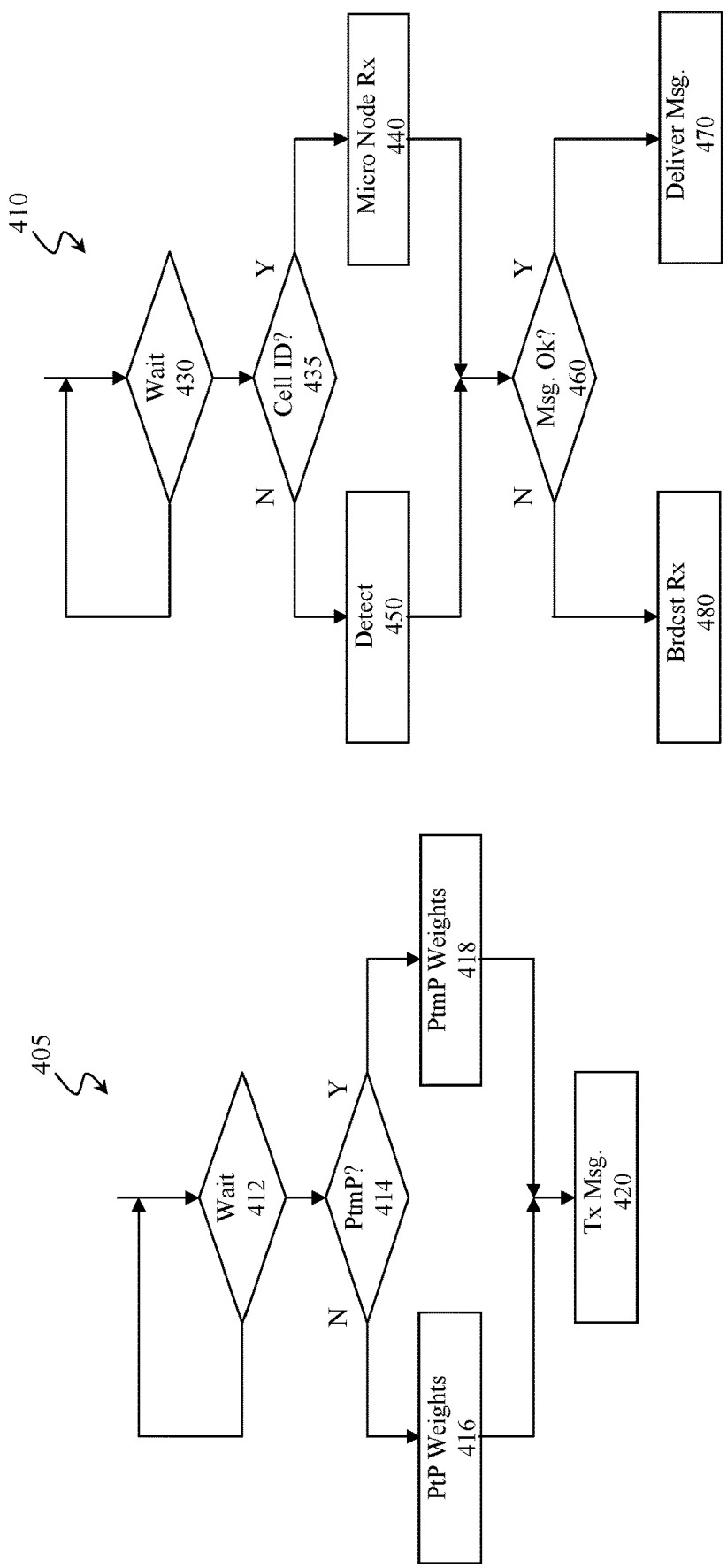
FIG. 4 illustrates flow charts of operations carried out by a transmitting micro node and a receiving micro node of the cellular network of FIG. 1 according to an embodiment of the present invention.

In order to describe in greater detail how a transmitting small cell 125(t) exchanges coordination information with a receiving small cell 125(r) according to an embodiment of the present invention, reference will be now made to FIG. 4, illustrating a flow chart 405 of the operations carried out by the micro node 120 serving the transmitting small cell 125(t) (hereinafter referred to as transmitting micro node 120(t)) and a flow chart 410 of the operations carried out by the micro node 120 serving the receiving small cell 125(r) (hereinafter referred to as receiving micro node 120(r)).

Making reference to the flow chart 405, the transmitting micro node 120(t) enters into a wait state (block 412) until a free transmission subframe is available. For example, in case a token ring protocol is used, the transmitting micro node 120(t) exits from the wait state as soon as it receives a transmission control token identifying the time slot in which such node is allowed to transmit.

As already mentioned above, two main different kinds of transmissions may be carried out, i.e., a PtP transmission (exit branch N of block 414) directed to transmit coordination information toward a single receiving small cell 125(r), or a PtmP transmission (exit branch Y of block 414) directed to broadcast coordination information toward a plurality of receiving small cells 125(r).

In the first case (PtP transmission), the transmitting micro node 120(t) retrieves from the routing table RT the beamforming weight W(t) corresponding to the receiving small cell 125(r) (block 416); for this purpose, the micro node 120(t) scans the routing table RT to identify the Cell ID A(r) of the receiving small cell 125(r). In the second case (PtmP transmission), the transmitting node 120(t) retrieves from the routing table RT the beamforming weight W(BRD) corresponding to a broadcast transmission (block 418); for this purpose, the micro node 120(t) scans the routing table RT to identify the Cell ID A(BRD) corresponding to the broadcast transmission.

In both cases, once the beamforming weight W(t) or W(BRD) is retrieved, a message M to be sent is generated, comprising:

a payload portion including the coordination information to be sent;

an address portion comprising the Cell ID A(t) of the transmitting small cell 120(t) and the Cell ID A(r) of the receiving small cell 120(r) (or the Cell ID A(BRD) corresponding to a broadcast transmission), an error detecting portion comprising a check word, such as a Cyclic Redundancy Check (CRC) word g calculated using the payload portion, and then the message M is transmitted on the ePDCCH 230 by configuring the antenna(s) of the transmitting micro node 120(t) with the retrieved beamforming weight W(t) or W(BRD) (block 420).

In order to reduce the size of the message M, according to an embodiment of the present invention, the address portion of the message M may be embedded in the CRC word g. For this purpose, a masked CRC word gm may be obtained by calculating the EXOR between the CRC word g and a word obtained by concatenating the Cell ID A(t) with the Cell ID A(r) (or the Cell ID A(BRD)).

Making reference to the flow chart 410, the receiving micro node 120(r) enters into a wait state (block 430) until a free reception subframe is available. For example, in case a token ring protocol is used, the receiving micro node 120(r) exits from the wait state as soon as it passes the transmission control token—identifying the time slot in which such node is allowed to receive—from another micro node 120.

The receiving micro node 120(r) may be already aware of the Cell ID A(t) of the transmitting micro node 120(t) having carried out the transmission, such as for example because a token ring protocol is employed, (exit branch Y of block 435), or instead the receiving micro node 120(r) may not be aware of it (exit branch N of block 435).

Since according to an embodiment of the present invention transmission and reception are carried out at a same frequency band, i.e., exploiting the ePDCCH 230, the beamforming weights used for the transmission can be reused also for the reception from the same small cell (both for PtP and PtmP communication). Therefore, if the receiving micro node 120(r) knows the Cell ID A(t) of the transmitting micro node 120(t) having carried out the transmission, the receiving micro node 120(r) performs detection on the ePDCCH 230 by configuring the antenna(s) of the receiving micro node 120(r) with the beamforming weight W(t) stored in its routing table RT corresponding to a transmission from the transmitting micro node 120(t) (block 440).

If instead the receiving micro node 120(r) does not know the Cell ID A(t) of the transmitting micro node 120(t) having carried out the transmission, the receiving micro node 120(r) may perform a detection on the ePDCCH 230 using simple forms of antenna combining, such as the Maximum Ratio Combining (MRC) (block 450).

In any case, once the receiving micro node 120(r) detected a received message M' on the ePDCCH 230, a consistency check is carried out (block 460), such for example a CRC check using the payload and then removing the masking operation using the Cell ID A(r) of the receiving micro node 120(r) together with the Cell ID A(t) (if known) or a tentative Cell ID A(i) of a possible transmitting micro node (if Cell ID A(t) is not known).

If the outcome of the consistency check is positive (exit branch Y of block 460), the received message M' is assessed to be the correct message M transmitted by the transmitting micro node 120(*t*), and therefore the received message M' (comprising coordination information in the payload portion) is delivered to the higher layers of the cellular network 100 (block 470).

If instead the outcome of the consistency check is negative (exit branch N of block 460), it means that at least one among the following conditions have been occurred:

there have been errors in the payload portion of the message M;

the Cell ID A(t) of the transmitting micro node 120(*t*) is incorrect;

the message M was intended to another destination different than the receiving micro node 120(*r*);

no message M was transmitted on the ePDCCH 230 during said subframe;

the message M was intended to be broadcasted instead to be transmitted to a single receiving micro node 120(*r*).

In the last case, i.e., if the message M was intended to be broadcasted, the receiving micro node 120(*r*) carries out a further detection on the ePDCCH 230, this time by configuring the antenna(s) of the receiving micro node 120(*r*) with the beamforming weight W(BRD) corresponding to a broadcast transmission (block 480).

In the other cases, the transmission is deemed to be failed.

According to an embodiment of the present invention the beamforming weights W(i) can be advantageously updated using an iterative learning procedure which takes advantage of the fact that transmission and reception are carried out at a same frequency band, i.e., exploiting the ePDCCH 230, and therefore the beamforming weights W(i) used by a first small cell for the transmission to a second small cell can be reused also by said first small cell for receiving transmissions coming from the second small cell. Said updating procedure provides for updating the beamforming weight W(i) for the transmission to a given small cell 125 destination identified by given Cell IDs A(i) by exploiting a beamforming weight W(i) learned during the reception of the most recent message from that small cell 125. In case there are not recent messages, the beamforming weight W(i) stored in the routing table RT of the small cell 125 can be advantageously used.

More in detail, the updating procedure according to an embodiment of the present invention provides for an estimation phase, in which a new estimation of the beamforming weight W(i) used by a micro node 120 for reception of a transmission coming from a small cell 125 identified by the Cell ID A(i) is estimated using iterative algorithms-such as Least Mean Squares (LMS) or Recursive Least Squares (RLS)—on the DM-RS sequence transmitted by said small cell 125 through the ePDCCH 230. Then, the beamforming weight W(i) stored in the routing table RT of the micro node 120 is updated with said new estimation.

For example, in case of PtP transmission, according to an embodiment of the present invention the updating can be performed by exploiting the following formula:

$$W(i)(t_k)=(1-\lambda_U)\cdot W(i)(t_{k-m})+\lambda_U\cdot \tilde{W}(i)(t_{k-1}),$$

wherein $W(i)(t_{k-m})$ is the beamforming weight previously stored in the routing table RT at time $t_{k-m}$, $t_{k-m}$, $\tilde{W}(i)(t_{k-1})$ is the new estimation of the beamforming weight obtained from the successful reception on the ePDCCH 230 of a data packet at time to, $t_{k-1}$, $W(i)(t_k)$ is the updated beamforming weight stored in the routing table RT at time $t_k$, and $\lambda_U$, referred to as forgetting factor, is a number >0 and <1 that is used to have the best compromise between adaptation speed and robustness against estimation errors.

The forgetting factor $\lambda_U$ can be set considering that the beamforming weights will have in most cases just small changes in time, due only to the changes in the surrounding clutter (e.g., vehicles, moving persons, etc.). This is particular evident in dense urban scenarios where the small cells 120 are fixed and can be in line of sight among each other.

Similar considerations apply in case of a PtmP transmission. In this case, the updating can be performed by exploiting the following formula:

$$W(BRD)(t_k)=(1-\lambda_B)\cdot W(BRD)(t_{k-m})+\lambda_B\cdot \tilde{W}(BRD)(t_{k-1}),$$

wherein the forgetting factor $\lambda_B$ is a number >0 and <1 that may be different than the forgetting factor $\lambda_U$ used for the PtP transmission.

According to an embodiment of the present invention, in order to facilitate the updating of the beamforming weights W(i), when a micro node 120 is activated (e.g., when resuming after a power saving state), it will send a wake-up message WUM to allow the other micro nodes 120 to update their beamforming weights W(i) to be used for transmission/reception towards that just activated micro node 120. The wake-up message WUM is transmitted by configuring the antenna(s) of the just activated micro node 120 with a beamforming weight W(BRD) for a broadcast communication (i.e., using an omnidirectional radiation pattern) so that the receiving micro nodes 120 are able to detect the clean state of the ePDCCH 230. Moreover, the wake-up message WUM is transmitted using the Cell ID A(i) of the small cell 125 served by the transmitting micro node 120.

Similarly, when a micro node 120 is going into a sleep state (e.g., triggered by a traffic activity timer), such micro node 120 will send a sleep message SM to the neighboring micro nodes 120 in order to inform them about its new status. Such information may be useful to manage those procedures like CoMP, handovers, etc. that require the coordination among multiple micro nodes 120.

According to an embodiment of the present invention, the wake-up message WUM comprises information that is useful for the neighboring micro nodes 120 in order to adapt the interference coordination procedures and update the routing tables RT when a new micro node 120 is deployed in the area. This information may include for example at least one among:

transmission power density indicator P(i) corresponding to the micro node 120;

system bandwidth;

Cell ID A(i) of the small cell 125 served by the micro node 120;

Reference signal configuration;

micro node 120 position information (e.g., for outdoor micro nodes 120 provided with integrated GPS)

According to an embodiment of the present invention, the routing table RT stored in the memory of each micro node 120 can be updated by means of the wake-up messages WUM transmitted by the adjacent micro nodes 120 when they are powered on for the first time or when the micro node 120 resumes from the sleep state.

According to an embodiment of the present invention, the routing table RT can be also updated autonomously by each micro node 120 through direct sensing of the environment by detecting the Synchronization and Broadcast Channels transmitted by the adjacent micro nodes (i.e. acting like a UE when performs the cell selection procedure).

According to an embodiment of the present invention, for the purpose of small cell to small cell communication, if the messages M comprising coordination information have small size, they can be carried directly by the payload of the ePDCCH 230 (for 4G communication systems) or by the HS-SCCH (for 3G communication systems). In case of larger message size, the messages M comprising coordination information can be carried by the associated PDSCH 220 (for 4G communication systems) or by the HS-PDSCH (for 3G communication systems).

Making reference to 4G, in the case of larger message size, the ePDCCH 230 just provides to the destination micro node 120 an indication about the resources used for the transmission of the interference coordination message (as it happen in the normal ePDCCH usage for small cell to UE communication). The usage of the PDSCH 220 can be considered in particular when a full replacement of the X2 interface with a wireless interface is required.

An exemplary case is during the Handover (HO) procedure where data, still to be transmitted and stored in the MAC queue, have to be transferred from a small cell 125 to another small cell 125. In such a case the usage of a higher capacity channel like the PDSCH 220 is more appropriate. The type of coordination information carried by the ePDCCH 230 or by the associated PDSCH 220 may depend on the type of interference coordination algorithms implemented in the network (e.g., ICIC, eICIC, CoMP). In the following some examples are provided but other quantities and/or measures can be envisaged without departing from the scope of the invention:

1. Common RS (Reference Signal) configuration used by the micro nodes 120;
2. RSRP (Reference Signal Received Power)/RSRQ (Reference Signal Received Quality) measures of the adjacent micro nodes 120;
3. List of the neighboring micro nodes 120;
4. List of allocated RBs in the current and/or next subframes in both downlink and uplink;
5. Level of interference measured in the uplink (wideband measure or on RB basis);
6. Transmission Modes (TM) used in the allocated RBs in the current and/or next subframes;
7. Transport Format (i.e., TBS-Transport Block Size-, modulation, number of streams, etc.) used in the allocated RBs in the current and/or next subframes;
8. ABS (Almost Blank Subframe)/MBSFN (Multicast Broadcast Single Frequency Network) subframes pattern configured for the micro nodes;
9. Power control bits in case of PtP messages;
10. Data stored in MAC (Media Access Control) queues.

The information related to the items 6 and 7 are in particular useful in case of UE receivers that exploit the assistance of the network to improve the effectiveness of the interference rejection algorithms implemented at the UE side for NAICS (Network Assisted Interference Cancellation and Suppression). Conversely the items 4 and 5 are more suitable for the ICIC procedure in the frequency domain standardized in the Release 8 of the LTE specifications. The information related to the item 8 is instead specific for the eICIC procedure standardized in the Release 10 of the LTE specifications. Conversely, the item 10 is applicable for the HO procedure based on the PDSCH channel. Finally, a header based on formats like TLV (Tag-Length-Value) or other alternative formats can be included in the message to signal the type of information that will be delivered by the payload.

It should be noted that the procedure described above may undergo several modification, e.g. similar steps with the same functions may substitute several steps or portions thereof, some non-essential steps may be removed, or additional optional steps may be added, the steps may be performed in different order, in parallel or overlapped (at least in part), without departing from the scope of the present invention.

Even if in the description reference has been explicitly made to a method for exchanging coordination information between small cells of a cellular network, the concepts of the present invention can be applied to macro cells as well to other kind of cellular network cells.

The invention claimed is:

1. A method for managing a cellular network, the cellular network including: a plurality of base stations each one configured to exchange data with user equipment located in a corresponding cell by using a downlink data channel and an uplink data channel according to a frequency division duplexing scheme;

the method comprising:
having a first base station exchange coordination information with a second base station, the coordination information being related to at least one among channel state condition and resources allocation to user equipment, the coordination information being exchanged by:
transmitting the coordination information from the first base station to the second base station via an enhanced physical downlink control channel (ePDCCH) of the downlink data channel using beamforming.

2. The method of claim 1, wherein the ePDCCH of the downlink channel is also used for transmission of resource allocations to the user equipment.

3. The method of claim 1, wherein the transmitting the coordination information from the first base station to the second base station is carried out according to a time division duplexing scheme.

4. The method of claim 3, wherein the time division duplexing scheme is a token ring scheme or a carrier sense multiple access with a collision detection scheme.

5. The method of claim 1, wherein the transmitting the coordination information from the first base station to the second base station using beamforming comprises:
retrieving from a routing table stored at the first base station a beamforming weight corresponding to the second base station;
generating a message including the coordination information;
transmitting the message on the portion of the downlink data channel by configuring at least one antenna of the first base station according to the retrieved beamforming weight.

6. The method of claim 5, further comprising:
retrieving from a routing table stored at the second base station a further beamforming weight corresponding to the first base station;
carrying out detection on the portion of the downlink data channel by configuring at least one antenna of the second base station according to the retrieved further beamforming.

7. The method of claim 6, wherein the generating a message comprises generating:
a payload message portion including the coordination information;
an address message portion including an address identifier of the cell corresponding to the first base station and an address identifier of the cell corresponding to the second base station.

8. The method of claim 7, wherein the retrieving a beamforming weight corresponding to the first base station or to the second base station is carried out based on the address identifier of the cell corresponding to the first base station or to the second base station, respectively.

9. The method of claim 8, wherein the generating a message further comprises embedding the address message portion in an error detection message portion including a check word based on the payload portion.

10. The method of claim 6, further comprising:
calculating a new estimation of the further beamforming weight according to demodulation reference signals transmitted by the first base station on the portion of the downlink data channel;
updating the routing table stored at the second base station by updating the further beamforming weight corresponding to the first base station according to the new estimation.

11. The method according to claim 1, wherein the portion of the downlink data channel corresponds to:
a frequency range comprising a set of resource blocks, and
a time range comprising a set of transmission time intervals.

12. The method of claim 11, wherein the coordination information comprises information relating to at least one of:
common reference signal configuration used by the base stations;
reference signal received power measures of adjacent base stations;
reference signal received quality measures of adjacent base station;
list of neighboring base stations;
list of allocated resource blocks in the current and/or next transmission time intervals in both downlink and uplink;
level of measured uplink interference;
transmission modes used in the allocated resource blocks in a current and/or next transmission time interval;
transport format used in the allocated resource blocks in the current and/or next transmission time intervals;
almost blank subframe transmission time interval pattern configured for the base stations;
multicast broadcast single frequency network transmission time interval pattern configured for the base stations;
power control bits; or
data stored in media access control queues.

13. A system, comprising:
a first base station and a second base station of a cellular network, each one of the first and second base stations being configured to exchange data with user equipment located in a corresponding cell by exploiting a downlink data channel and an uplink data channel according to a frequency division duplexing scheme, wherein:
the first base station is further configured to exchange coordination information with the second base station, the coordination information being related to at least one among channel state condition and resources allocation to user equipment; and
the first base station is further configured to transmit the coordination information to the second base station via an enhanced physical downlink control channel (ePDCCH) of the downlink data channel using beamforming.

14. The system of claim 13, wherein the cellular network is a cellular network complying with a selected one of:
3G standard;
4G standard;
5G standard.

* * * * *